United States Patent [19]
Goel et al.

[11] Patent Number: 6,124,957
[45] Date of Patent: Sep. 26, 2000

[54] OPTICAL SIGNAL TRANSLATOR UNIT

[75] Inventors: Vibha Prakash Goel, Tinton Falls; Steven Russell Johnson, Fair Haven; Joseph P. Kunz, Red Bank; Philip Joseph Lauriello, Holmdel; Stan Lumish, Red Bank; Frank J. Peragine, Fair Haven, all of N.J.

[73] Assignee: Lucent Technologies Inc., Murray Hill, N.J.

[21] Appl. No.: 09/023,583

[22] Filed: Feb. 13, 1998

[51] Int. Cl.$^7$ ........................................... H04J 14/02
[52] U.S. Cl. .................. 359/133; 359/110; 359/127; 359/158; 359/177
[58] Field of Search ................... 359/124, 127, 359/133, 110, 177, 158

[56] References Cited

U.S. PATENT DOCUMENTS

| | | | |
|---|---|---|---|
| 5,225,922 | 7/1993 | Chraplyvy et al. | 359/124 |
| 5,943,147 | 9/1999 | Vanoli et al. | 359/110 |
| 5,956,166 | 9/1999 | Ogata et al. | 359/125 |

*Primary Examiner*—Jason Chan
*Assistant Examiner*—Vu T. Lieu

[57] ABSTRACT

The invention is directed to an optical node, e.g., a so-called add/drop site, that receives an optical carrier signal formed from a plurality of component optical signals of respective wavelengths and a plurality of different identification signals which identify respective ones of the wavelengths. As is typically the case, the node includes a demultiplexer that demultiplexes the optical carrier signal and outputs the demultiplexed component optical signals to respective optical paths. Disadvantageously, each of the demultiplexed optical component signals includes all of the identification signals as a result of such demultiplexing. However, we dispose an optical translator unit in at least one of the optical paths to remove all of the identification signals from the one component optical signals and also reset the power level of that signal. A transmitter in the translator unit outputs the latter signal as an optical signal in which the wavelength of the outputted optical signal may be changed on an optional basis to a wavelength that is different from the wavelength of the one component optical signal.

5 Claims, 2 Drawing Sheets

OPTICAL SIGNAL TRANSLATOR UNIT

FIELD OF THE INVENTION

The invention relates to the field of optical transmission systems.

BACKGROUND OF THE INVENTION

An optical transmission system may use low frequency tones to identify the different wavelengths of optical signal that it is transmitting over an optical path, e.g., an optical fiber. This is done, for example, to control the level of power that an optical signal amplifier outputs to an optical fiber on a per channel basis, and thus prevent overpowering the optical channel. Such overpowering typically causes the system to degrade as a result of so-called self-phase modulation which is induced by a non-linear fiber response in the optical channel. This problem is especially acute in an optical transmission system spanning an appreciable distance and employing a number of optical amplifiers to regenerate the optical signals at various points along the transmission system. For example, if a system has a single optical channel, then an optical amplifier, in response to receipt of an optical signal via that channel, may inject a relatively strong optical signal, e.g., a 16 dBm signal, into the associated optical fiber. It is likely then that the strong optical signal will cause the fiber to respond nonlinearly and thus severely degrade signals that are being transported over that channel. Thus, optical transmission systems use tones to identify which channels are active and to control the amplification of an optical signal.

We have recognized, however, that when the transmitted signals are received at a receiving node and demultiplexed to "drop" one or more channels for re-transmission to another optical node, each demultiplexed signal (wavelength) carries all of the transmitted identifications signals. Disadvantageously, circuits in the path to the other node as well as the other node may incorrectly conclude that the received signal includes more channels that it actually does as a result of the received signal carrying all of the originally transmitted identifications signals.

SUMMARY OF THE INVENTION

We deal with the foregoing problem and advance the relevant art by removing, in accordance with the invention, all of the identification signals from a demultiplexed signal before it is outputted to an optical node. In an illustrative embodiment of the invention such removing is achieved by converting a demultiplexed optical signal to an electrical signal and digitally sampling the electrical signal. Such sampling, limits the level of the converted signal to remove the identification tones, and also "refreshes" the received signal, all in accordance with different aspects of the invention. In addition, the wavelength of a demultiplexed optical signal may be translated into another wavelength and then outputted to a next optical node.

These and other aspects of the invention will be appreciated from the following detailed description, accompanying drawings and claims.

DETAILED DESCRIPTION

Figure 1:
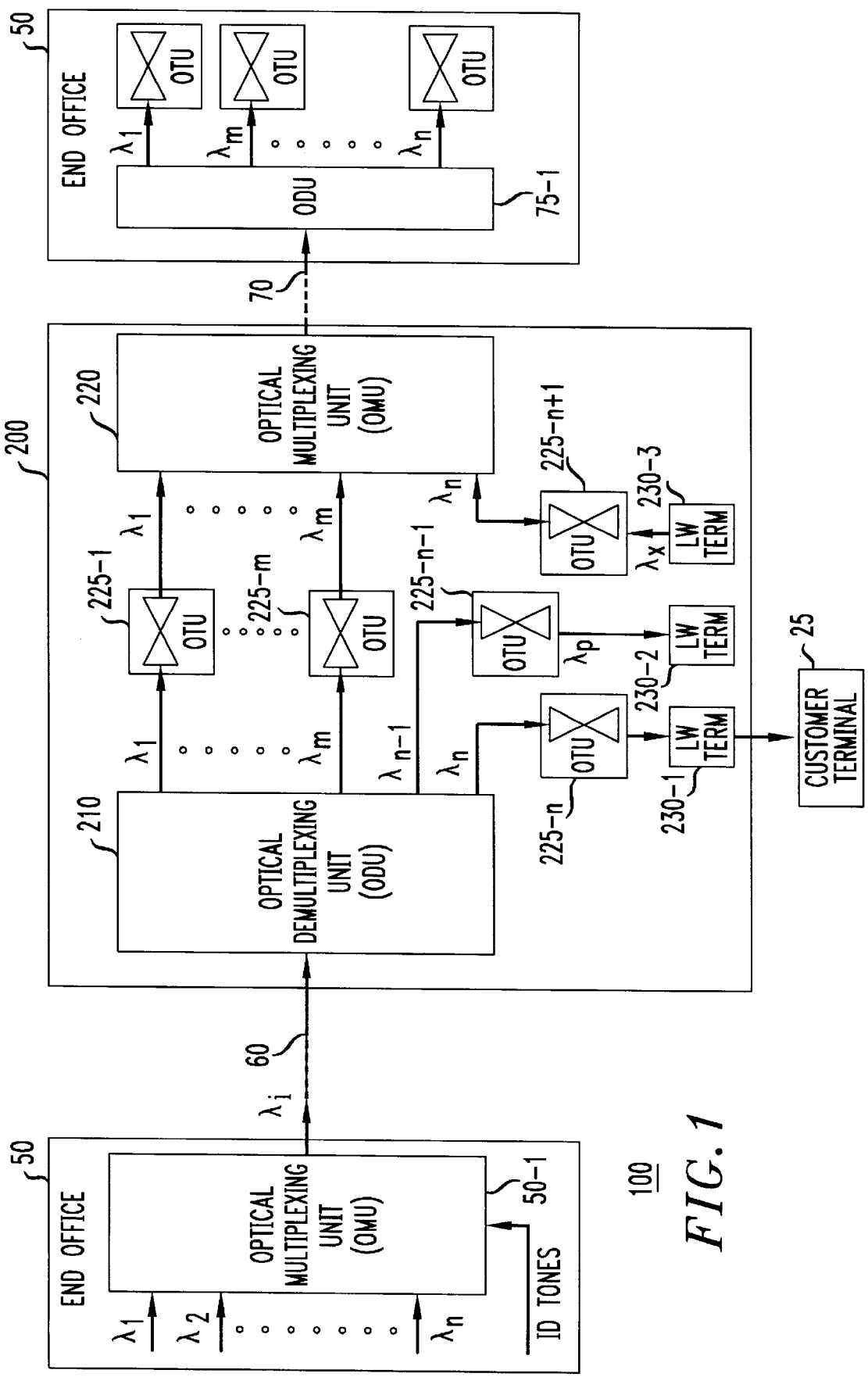
FIG. 1 shows in block diagram form an illustrative system in which the principles of the invention may be practiced.

An optical communications system employing the principles of the invention is illustrated in FIG. 1, and includes, among other things, a first end office 50 which receives a plurality of optical signals of different wavelengths, $\lambda_1$ through $\lambda n$, from respective customers and multiplexes the optical signals (which have been amplitude modulated by respective identification tones) onto an optical carrier signal using a conventional Wavelength Multiplexing Unit (WMU) 50-1. End office 50 supplies the multiplexed result to optical path 60. Optical path 60, which extends to optical node 200, may include one or more conventional optical amplifiers (as represented by the dashed portion of path 60) to regenerate the optical signal, $\lambda_i$, as it transported over path 60. The optical signal is received at optical node 200 (e.g., a conventional wavelength add/drop site) via Optical Demultiplexing Unit (ODU) 210. ODU 210, in turn, demultiplexes the optical signals into the component optical signals, ) $\lambda_1$ through $\lambda n$, and outputs those signals to respective paths. Such demultiplexing is done to "unbundle" the incoming optical signal so that signals of wavelengths $\lambda_n$ and $\lambda_{n+1}$ may be "dropped" at node 200 and delivered to intended receivers via respective LightWave (LW) Terminals. Signals, $\lambda_1$ through $\lambda_m$, on the other hand, extend directly to OM U 220 so that they can once again be multiplexed together with other optical signals for transmission over optical path 70 extending to end office 75.

Disadvantageously, as a result of the demultiplexing process each demultiplexed signal, $\lambda_1$ through $\lambda n$, is accompanied by all of the identification tones, which may cause a receiver, e.g., external customer site 25, to determine incorrectly that it is receiving signals $\lambda_1$ through $\lambda n$ when it is receiving only one such signal, e.g., $\lambda n$.

We deal with that problem by filtering each demultiplexed signal using what we call an Optical Translator Unit (OTU). Specifically, an OTU 225-i is disposed in each of the paths leaving ODU 210 to remove the tone accompany a respective optical signal, as will be explained below in detail. It is seen from the FIG. that ones of the demultiplexed optical signal are supplied to OMU 220 via respective ones of the OTUs 225-1 through 225-m. Other ones of the demultiplexed signals, namely $\lambda_{n-1}$ and $\lambda_4$, are supplied to OTUs 225-n-i and 225-n, respectively, and thence to LightWave (LW) Terminals 230-1 and 230-2, respectively, for delivery to an intended end user. As mentioned above, OTUs 225-n−1 and 225-n remove all identification tones from the demultiplexed optical signals that they receive from ODU 210 leaving only the appropriate tone. In addition, OTU 225-n−1 may translate the wavelength of the signal that it receives from ODU 210 into another wavelength, e.g., from $\lambda_{n-1}$ to $\lambda_p$, in accordance with an aspect of the invention. The OTU then supplies the resulting signal to LW Term 230-2 for delivery to an end user so that the end user thereat may process the data/information carried by the optical signal.

An OTU is further arranged to reset (refresh) the power level of the optical signal that it is processing to a nominal, predetermined power level, as will be explained below in detail.

In an illustrative embodiment of the invention LW terminals 230-1 through 230-3 may be respective bi-directional line-switched ring systems, such as the ring system disclosed in U.S. Pat. No. 5,442,620 issued Aug. 15, 1995, which is hereby incorporated by reference.

It is apparent that since demultiplexed signals $\lambda_{n-1}$ and $\lambda_n$ were "dropped" via LW Terminals 230-1 and 230-2, and not presented to OMU 220, then either one of those wavelengths may be used to carry other information originating from different (or the same) end user, as shown in the FIG. Specifically, LW Terminal 230-3 supplies an optical signal of wavelength $\lambda_x$ to OMU 220, in which it is assumed that the signal carries information associated with a user served by LW Terminal 230-3. Since system wavelength $\lambda_x$ is not being used at OMU 230, then OTU 225-n-1 may be arranged to translate the wavelength of the signal that it receives from terminal 230-3 into $\lambda_n$, a wavelength recognized within system 100. OTU 225-n-1 is also arranged to the add the identification tone to the signal and then output the resulting signal to OMU 230.

OMU 230, in a conventional way, multiplexes the optical signals that it receives onto an optical carrier and outputs the multiplexed result to optical path 70 for transmission to an intended destination, e.g., end office 75. Similarly, optical path 70 may include one or more optical amplifiers, as represented in the FIG. by the dashed portion of path 70. When the optical signal is received at ODU 75-1, then, in a similar manner, the signal is demultiplexed into the component signals which are then are supplied to either an OMU (not shown) within end office 75 for output to intended destinations or respective LW terminals, as the case may be.

Figure 2:
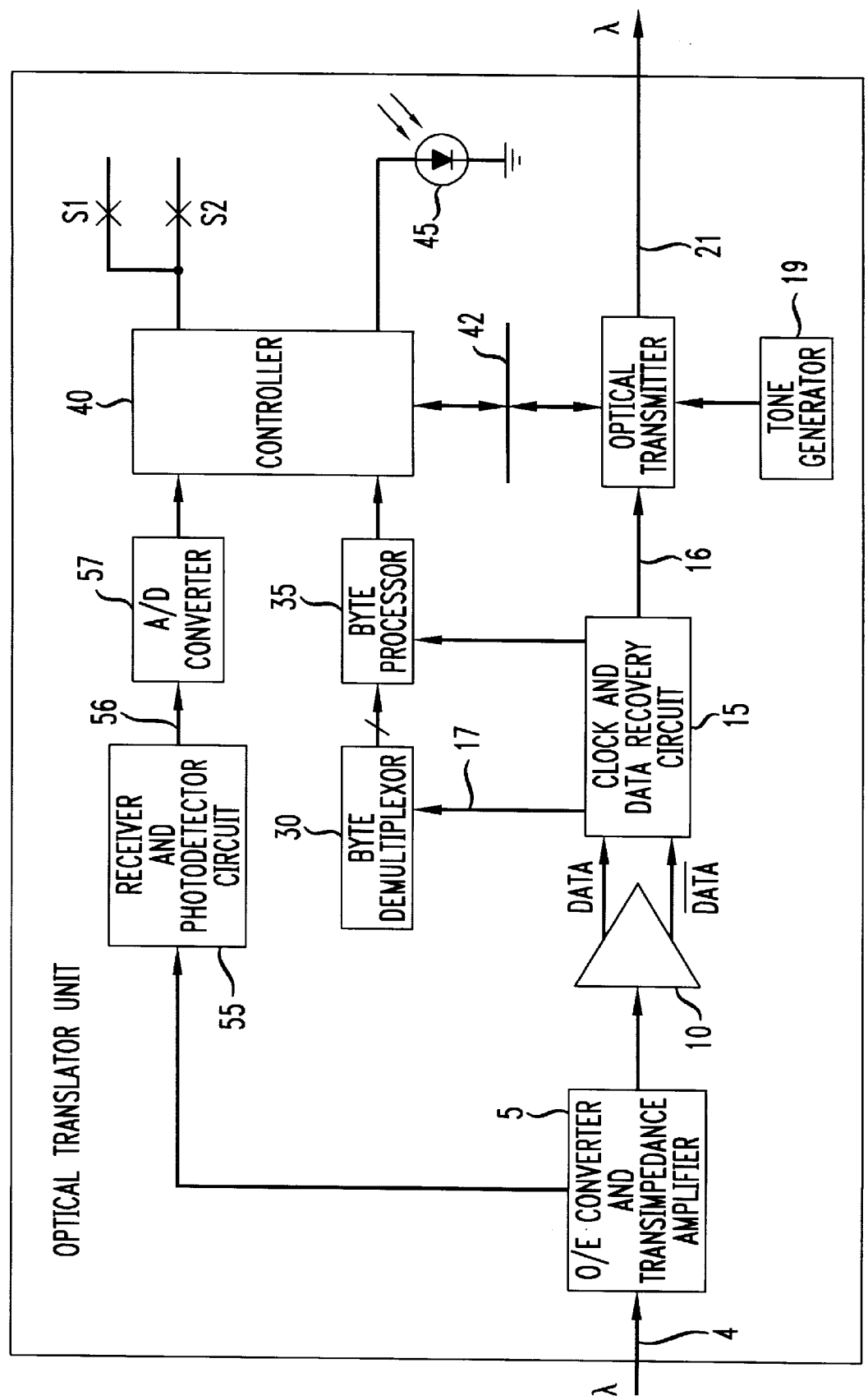
FIG. 2 is a block diagram of the Optical Translation Unit of FIG. 1.

A more detailed diagram of Optical Translator unit 225-i is shown in FIG. 2. O/E converter and transimpedance amplifier 5 uses a conventional avalanche photodiode and a preamplifier to convert the received optical signal to an amplified electrical signal. Circuit 5 then supplies the resulting signal to limiting amplifier 10. Limiting amplifier further amplifies the electrical signal from the O/E 5 and converts it from a single ended input to a differential output that is supplied to clock and data recovery circuit (CDR) 15. CDR 15 uses a conventional Phase-Locked Loop (PLL) circuit (not shown) to recover a line rate clock value from the electrical signal and "reclocks" the data stream using a conventional flip/flop to generate/recover the original data signal, e.g., a 2.5 Gbps SONET data signal. CDR 15 supplies the 2.5 mGps data signal to optical transmitter 20 via path 16. In an illustrative embodiment of the invention path 16 may be a coaxial cable. Circuit 15 also supplies the 2.5 Gbps data signal to byte demultiplexer circuit 30 along with the recovered 2.5 GHz clock signal. It is noted that if CDR 15 cannot recover the clock signal then it supplies the error to byte processor 35 via a "loss-of-signal" smoothing circuit (not shown) which tracks the rate of such errors. Byte processor 35, in turn, notifies controller 40.

Advantageously, the aforementioned reclocked (retimed) data signal filters (limits) the level of the received signal to a point that removes the identification tones "riding" on the converted signal and also resets (refreshes) the level of the incoming signal.

A receiver at the input of transmitter 20 appropriately biases the signal that it receives from CDR 15 so that a laser circuit in transmitter 20 may properly convert the data signal that it receives via path 16 into an optical signal. Transmitter 30 then outputs the signal to path 21. As mentioned above, the transmitter 20 laser may generate an optical signal having the same wavelength as the incoming optical signal or a different wavelength. That is, if the wavelengths are to be same, then a laser capable of generating that wavelength is inserted in transmitter 20. If the incoming wavelength is to be translated into another wavelength, then a laser capable of generating that wavelength is instead inserted in transmitter 20. One source for such lasers is Lucent Technologies, Inc., U.S.A. Also, transmitter 20 uses a sinusoidal identification signal/tone provided by tone generator 19 to amplitude modulate the optical signal that it generates. It then outputs the modulated result to path 21, as mentioned above. It is noted that the identification tone identifies the wavelength of the outputted optical signal, as also mentioned above. (It is also noted that transmitter 20 may employ a laser capable of changing the wavelength of the optical signal, as mentioned above.)

Byte demultiplexer 30 receives the non-inverted side of the 2.5 Gbps Differential data and 2.5 GHz differential clock from the CDR 15, as mentioned above. Demultiplexer 30 "disinterleaves" the line rate data into sixteen data streams which form two 8-bit parallel format words of a conventional SONET format. Demultiplexer 30 also provides a 155.52 MHz differential clock as well as the demultiplexed data to byte processor 35. Processor 35, responsive to receipt of the data words, determines, in a conventional manner, if the format of the received words conform with the SONET standard. That is, processor 35, determines the framing for the received data, and then extracts and processes the parity bits in the so-called line and section portions of the SONET transport overhead to determine the error rate. Byte processor 35 further processes the data words to detect a Loss of Signal (LOS) and/or loss of the incoming clock signal. Byte processor then sends the results of its determinations to controller 40.

Controller 40, inter alia, tracks the various error indicators that it receives from byte processor 35 and other circuits, and, if the level of any one of such errors reaches a respective threshold, then controller 40 may instruct transmitter 20 via system bus 42 to turn off its laser transmitter. Controller 40 also operates LED 45 to provide a visual indication that the OTU is out of service and further causes contacts S1 and S2 to operate as a way of notifying external customer equipment, e.g., a display terminal, audible alarm, etc., of that fact.

An OTU also includes receiver and photodetector circuit 55 which monitors the power level of the signal that O/E converter 5 receives via path 4. Circuit 55, more particularly, converts the signal to an electrical signal and measures the level of the current flowing out of the photodetector. Circuit 55 uses the current level as an indicator of the power level of the signal that is being received via path 4. Circuit 55 characterizes the measured power level using a corresponding voltage level between 0 to +5 volts and supplies the latter analog voltage level to analog to digital (A/D) converter circuit 57 via path 56. A/D converter 57 digitizes the voltage level and supplies the digital result to controller 40. Circuit 55 similarly monitors the voltage/power levels outputted by various power supplies (not shown) contained in the OTU and similarly supplies such voltage/power levels to controller 40 via A/ID converter circuit 57.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. An optical node for receiving an optical carrier signal formed from a plurality of component optical signals of respective wavelengths and a plurality of different identification signals, said node comprising a demultiplexer that demultiplexes the optical carrier signal and outputs the demultiplexed component optical signals to respective optical paths, wherein each of said demultiplexed optical component signals include all of said identification signals as a result of such demultiplexing, and an optical translator unit disposed in at least one of the optical paths, the optical translator unit comprising apparatus that removes all of the identification signals from that one of the component optical signals outputted to said at least one optical path as well as resets the power level of said one of the component optical signals.

2. The optical translator unit of claim 1 further comprising an optical to electrical converter circuit that receives the one component optical signal and converts that signal to an electrical signal, a clock and data recovery circuit that derives a clock signal from the electrical signal and digitizes the electrical signal to remove the identification signals and reset the power level of the received signal, and a transmitter that receives the digitized signal and uses that signal to drive an optical laser that converts the digitized signal to an optical signal and outputs the resulting optical signal to an optical path.

3. The optical translator unit of claim 2 wherein the optical laser is selected to generate an optical signal having a wavelength that is the same as the wavelength of said one of the component optical signals.

4. The optical translator unit of claim 2 wherein the optical laser is selected to generate an optical signal having a wavelength different from the wavelength of said one of the component optical signals.

5. The optical translator unit of claim 1 further comprising a tone generator that generates a tone identifying the wavelength of the signal that is generated by the optical laser, and wherein the transmitter uses the generated tone to amplitude modulate the optical signal generated by the optical laser.

* * * * *